(12) United States Patent
Shimatani (10) Patent No.: US 8,467,108 B2
(45) Date of Patent: Jun. 18, 2013

(54) IMAGE SCANNING DEVICE (75) Inventor: Akira Shimatani, Osaka (JP)

(73) Assignee: Kyocera Document Solutions Inc. (JP)

( * ) Notice: Subject to any disclaimer, the term of this patent is extended or adjusted under 35 U.S.C. 154(b) by 1103 days.

(21) Appl. No.: 12/348,625

(22) Filed: Jan. 5, 2009

(65) Prior Publication Data
US 2009/0180157 A1  Jul. 16, 2009

(30) Foreign Application Priority Data

Jan. 16, 2008 (JP) ................................ 2008-006621

(51) Int. Cl.
H04N 1/04 (2006.01)
(52) U.S. Cl.
USPC ........... 358/461; 358/496; 358/498; 358/486; 358/474
(58) Field of Classification Search
USPC ................. 358/461, 463, 465, 475, 474, 483, 358/482, 484, 48, 505, 509, 512–514; 382/274, 382/312, 318, 319; 399/211, 212; 250/208.1, 250/216, 234–236, 578.1
See application file for complete search history.

(56) References Cited

U.S. PATENT DOCUMENTS

| | | | | |
|---|---|---|---|---|
| 5,608,547 A * | 3/1997 | Nakatani et al. | ............... | 358/505 |
| 5,900,950 A * | 5/1999 | Hsu | ................ | 358/497 |
| 5,982,948 A * | 11/1999 | Shimada et al. | .............. | 382/274 |
| 6,069,707 A * | 5/2000 | Pekelman | ...................... | 358/1.6 |
| 6,437,358 B1 * | 8/2002 | Potucek et al. | ......... | 250/559.45 |
| 6,438,271 B1 * | 8/2002 | Usami et al. | .................. | 382/274 |
| 6,465,801 B1 * | 10/2002 | Gann et al. | ................ | 250/559.4 |
| 6,487,321 B1 * | 11/2002 | Edgar et al. | ................... | 382/260 |
| 6,498,867 B1 * | 12/2002 | Potucek et al. | ............... | 382/274 |
| 6,987,892 B2 * | 1/2006 | Edgar | .......................... | 382/254 |
| 7,525,703 B2 * | 4/2009 | Yasuda | ........................ | 358/521 |
| 7,558,437 B2 * | 7/2009 | Misaka | ........................ | 382/275 |
| 7,564,599 B2 * | 7/2009 | Ueno | ............................ | 358/475 |
| 7,751,098 B2 * | 7/2010 | Tseng | ........................... | 358/484 |
| 7,830,563 B2 * | 11/2010 | Aoki | ............................ | 358/498 |
| 2005/0206968 A1 | 9/2005 | Sodeura et al. | | |
| 2009/0122363 A1 * | 5/2009 | Yamazaki | ..................... | 358/475 |
| 2010/0134855 A1 * | 6/2010 | Oumi | ........................... | 358/475 |
| 2010/0253983 A1 * | 10/2010 | Bin et al. | ..................... | 358/475 |
| 2010/0259800 A1 * | 10/2010 | Wei et al. | ..................... | 358/475 |
| 2011/0304862 A1 * | 12/2011 | Itoh et al. | ....................... | 358/1.9 |

FOREIGN PATENT DOCUMENTS

| | | |
|---|---|---|
| CN | 1674623 | 9/2005 |
| JP | 8-152771 | 6/1996 |
| JP | 3581748 B2 | 10/2004 |

* cited by examiner

Primary Examiner — Cheukfan Lee
(74) Attorney, Agent, or Firm — Ostrolenk Faber LLP (57) ABSTRACT

An image scanning device comprises a white reference board having a uniform white color; an irradiation device including a light source unit having a light source, the light source unit configured to irradiate a reflection side of the white reference board from only one oblique direction; an image sensor configured to detect reflected light from the white reference board; and a determination device configured to determine if an attached substance exists on the white reference board based on the reflected light detected by the image sensor. The irradiation device includes a reflection board configured to rotate and to focus the light from the light source by its rotation and reflect the focused light onto a manuscript. The irradiation device is configured to irradiate uniformly the manuscript with both the light source and the reflection board when the manuscript is scanned, and to irradiate the white reference board from only one oblique direction with the light source before white reference data are generated from the white reference board.

2 Claims, 9 Drawing Sheets

IMAGE SCANNING DEVICE

CROSS-REFERENCE TO RELATED APPLICATIONS

This application claims priority under 35 U.S.C. §119 to Japanese Patent Application No. 2008-006621 filed on Jan. 16, 2008. The entire disclosure of Japanese Patent Application No. 2008-006621 is hereby incorporated herein by reference.

BACKGROUND OF THE INVENTION

1. Field of the Invention

The present invention generally relates to an image scanning device, and more specifically to an image scanning device for enhancing accuracy of detecting a substance attached to a reflection side of a white reference board provided in the image scanning device.

2. Related Art

In an image scanning device (e.g., a copier), the amount of light to be scanned varies depending on the variation of the amount of light irradiated by a light source, variation of sensitivity of a photoelectric conversion part (e.g., a detection side of an image sensor), and the like. When the amount of light varies, quality of an image obtained by the scanning of a manuscript will be lowered. In response to this, shading correction processing is executed for inhibiting the low image quality. Here, the image scanning device is provided with a white reference board. The white reference board has a uniform white color, and is also referred to as "a shading board." Specifically, the white reference board is oppositely disposed to the detection side of the image sensor.

The amount of light is generally corrected with the above-mentioned white reference board. A series of the correction processing is referred to as "the shading correction." Specifically, two light sources are simultaneously turned on. The light sources are disposed in symmetrical positions, and the reflection side of the white reference board is interposed between them. With this arrangement, a scanning position is irradiated from both directions of the light sources. Then, the image sensor scans the light reflected by the white reference board as the white reference board data (hereinafter simply referred to as "white reference data"). Subsequently, a manuscript is scanned as image data. Next, the image data of the manuscript are converted while the white reference data are used as a reference of white color. Thus, the corrected image data of the manuscript are obtained. The corrected image data of the manuscript have an image with uniform brightness and sharpness, and deterioration of the image quality is maximally inhibited.

In the above-mentioned shading correction, the white reference data are used as a reference of white color. Accordingly, when a substance (e.g., a small piece of paper or dirt) attaches to the reflection side of the white reference board, data attributed to the attached substance will be included in the white reference data. When the shading correction is performed with the white data including the data attributed to the attached substance, a portion of the image will have abnormal density. Here, the portion with abnormal density corresponds to a portion of the reflection side of the white reference board with the attached substance. When the image is entirely seen, only the portion seems to have a line. As a result, image quality of the manuscript will be deteriorated, and it is difficult to obtain image data of a manuscript with sharpness.

In order to solve the above-mentioned problem, the conventional art has proposed a configuration with a roll shaped white reference board. In the art, when defect is generated in the white reference data because of the attached substance, the white reference board is rotated. A portion of the white reference board with the attached substance is thus prevented from being used as the reflection side of the white reference board. In short, the reflection side of the white reference board is changed. Accordingly, even when the substance is attached to the white reference board, the white reference data are allowed to be obtained through a portion of the white reference board without the attached substance. Deterioration of the image quality is thus prevented.

Also, Japanese Patent Publication No. 3581748 discloses a configuration that the accuracy of shading correction is determined with the white reference data based on the image data binarized with a predetermined threshold value. According to the publication, it is possible to determine the accuracy of shading correction with normal image processing steps performed by an image scanning device. Also, with the above-mentioned configuration, accuracy of shading correction is determined before the scanning of an image on the manuscript. Therefore, it is possible to prevent deterioration of image quality attributed to deterioration of an optical system, dirt, a scratch, and the like.

However, the above-mentioned conventional art is required to change the reflection side of the white reference board. Therefore, the number of components is increased and spaces for the components are necessary.

Also, according to the art disclosed in Japanese Patent Publication No. 3581748, even ignorable tiny specks of dirt will be detected when the threshold value is set too low. Accordingly, frequent cleaning is necessary for the white reference board. On the other hand, the attached substance is not detected when the threshold value is set too high. Accordingly, not detecting the attached substance causes deterioration in the image quality. In short, without an appropriate setting for the threshold value, chances of erroneously determining accuracy of shading correction will be higher. As a result, it is impossible to prevent appropriately deterioration of the image quality.

Furthermore, the above-mentioned arts are configured to determine if the attached substance exists based on the white reference data. However, the white reference data are obtained when the amount of irradiated light is extremely large. Therefore, there is little difference between the amount of reflected light from the white reference board and the amount of reflected light from the attached substance. Accordingly, there is a limitation in the detection accuracy of the attached substance.

Accordingly, aspects of the present invention have been created to solve the above-mentioned problems occurring in the conventional practice, and to provide an image scanning device for enhancing accuracy of detecting substance attached to a reflection side of a white reference board provided in the image scanning device.

SUMMARY OF THE INVENTION

A first aspect of the present invention relates to an image scanning device. The image scanning device includes a white reference board with a uniform white color, an irradiation device, an image sensor, and a determination device. The irradiation device includes a light source unit. The light source unit is configured to irradiate a reflection side of the white reference board from only one oblique direction. The image sensor is configured to detect reflected light from the white reference board. The determination device is configured to determine if an attached substance exists on the reflection side of the white reference board based on the reflected light detected by the image sensor.

The white reference board may be formed in various suitable shapes as long as it has a uniform white color. For example, the white reference board may be formed in a board shape or a roll shape. When the white reference board is formed in a roll shape, it is possible to change easily the reflection side of the white reference board to be scanned by the image sensor. Accordingly, when existence of the attached substance on the reflection side of the white reference board is determined, it is possible to cope promptly with this.

For example, the above-mentioned oblique direction is one of various suitable directions within a range of incident angle of 0 to 90 degrees formed by an incident direction of a line and a direction perpendicular to the reflection side of the white reference board. Furthermore, when the incident angle falls in the range of 30 to 60 degrees, a shadow is easily cast from the attached substance attached on the reflection side of the white reference board. Thus, the incident angle is preferably from 30 to 60 degrees. Accordingly, it is possible to enhance the accuracy of detecting the attached substance.

The irradiation device is configured to irradiate the reflection side of the white reference board from only one oblique direction. The direction on the reflection side of the white reference board may be any of the following: a manuscript transporting direction for transporting the manuscript; the opposite direction from the manuscript transporting direction; a sub-manuscript transporting direction perpendicular to a plane including the manuscript transporting direction; the opposite direction from the sub-manuscript transporting direction; an oblique 45 degree direction with respect to the manuscript transporting direction; and the opposite direction from the oblique 45 degree direction with respect to the manuscript direction.

For example, it is possible to use a charge couple device (CCD), a complementary metal oxide semiconductor (CMOS) sensor, and a contact image sensor (CIS) as the image sensor.

The image sensor may be suitably arranged as long as it is configured to detect the reflected light from the white reference board. For example, the detection side of the image sensor may be opposed to the white reference board. Furthermore, a reflection board may be provided in a predetermined position. In this case, the reflection board may be arranged to guide the reflected light from the white reference board to the detection side of the image sensor. Also, a transparent board (e.g., a glass board and an acrylic board) may be arranged between the image sensor and the white reference board as long as it does not block the image sensor from detecting the reflected light from the white reference board.

The determination device may be configured to determine if the attached substance exists with a suitable method. For example, "attached-substance threshold value" may be preliminarily stored in a predetermined storage device. The attached-substance threshold value corresponds to a predicted value of the amount of reflected light from the attached substance. When the amount of reflected light from the white reference board includes an amount of light that is less than the attached-substance threshold value, it is determined that the attached substance exists on the reflection side of the white reference board.

For example, the attached-substance threshold value is computed by averaging the amount of the reflected light from the attached substance (e.g., paper powder and dirt) generated in the interior of the image scanning device by the irradiation device. Also, it is possible to use the amount of reflected light from the shadow cast by the attached substance instead of using the amount of the reflected light from the attached substance.

Also, the irradiation device may be configured to irradiate with either of two light sources symmetrically arranged through a lens.

As an example, the light source unit includes two light sources, and the light sources are symmetrically arranged through a lens. Also, the light source unit may be one of various suitable units as long as it includes at least one of the following: a light source for irradiating a manuscript disposed in the vicinity of the image sensor; a light source for irradiating the interior of the image scanning device; a light source for the shading correction; and a light source exclusively for determining if the attached substance exists.

Furthermore, it is possible to use an incandescent light bulb, a fluorescent lamp, a high-intensity discharge lamp, a light-emitting diode (LED), and the like as a light source included in the light source unit.

For example, the irradiation device may be provided with two light sources, and either of the light sources may be turned on. In this case, when existence of the attached substance is determined, one of the two light sources is configured to be turned on while the other of the light sources is configured to be turned off.

Also, the light source unit of the irradiation unit may be configured to irradiate with a light source excluding the light source for scanning the image on the manuscript.

Also, the irradiation device may be further provided with a reflection board for focusing light from the light source. The reflection board and the light source excluding the light source for image scanning may be configured to irradiate the reflection side of the white reference board from only one oblique direction.

The reflection board may be formed in one of various suitable shapes as long as it focuses the light from the light source. For example, it may be formed in a board shape or a circular shape.

The reflection board may be arranged in a variety of suitable positions as long as it is configured to irradiate the reflection side of the white reference board from only one oblique direction with a light source. For example, the reflection board may be arranged in the vicinity of a light source provided in the image scanning device. Also, the reflection board may be arranged away from a light source. Furthermore, a movable reflection board may be used. In this case, the reflection board is configured to be arranged in a predetermined position only when existence of the attached substance is determined. Also, the reflection board may be movably arranged for regulating the angle of the reflected light.

Furthermore, a cleaning device, an alarm, and a display device may be provided. When the existence of the attached substance is determined, the cleaning device is configured to remove the attached substance. Also, at this time, the alarm is configured to alert of the existence of the attached substance, and the display device is configured to display existence of the attached substance.

In the above-mentioned image scanning device of the present invention, the irradiation device irradiates the reflection side of the white reference board from only one oblique direction, and the determination device determines if the attached substance exists on the reflection side of the white reference board based on the reflected light.

Accordingly, when the attached substance exists on the reflection side of the white reference board, the existence of the attached substance is determined not only by detecting the amount of reflected light from the attached substance, but also by detecting the amount of reflected light from the shadow cast from the attached substance. There is much difference between the amount of reflected light from the white reference board and the amount of reflected light from shadow cast from the attached substance. In addition, the amount of reflected light from shadow is quite small. Therefore, it is possible to detect accurately the existence of a shadow, that is, the existence of the attached substance. As a result, it is possible to detect reliably the attached substance before the shading correction is performed. Furthermore, it is possible to prevent deterioration of an image to be caused by the attached substance.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. Also, the letter "S," at the start of a string in the flowchart of FIG. 7, stands for a "Step."

Figure 1:
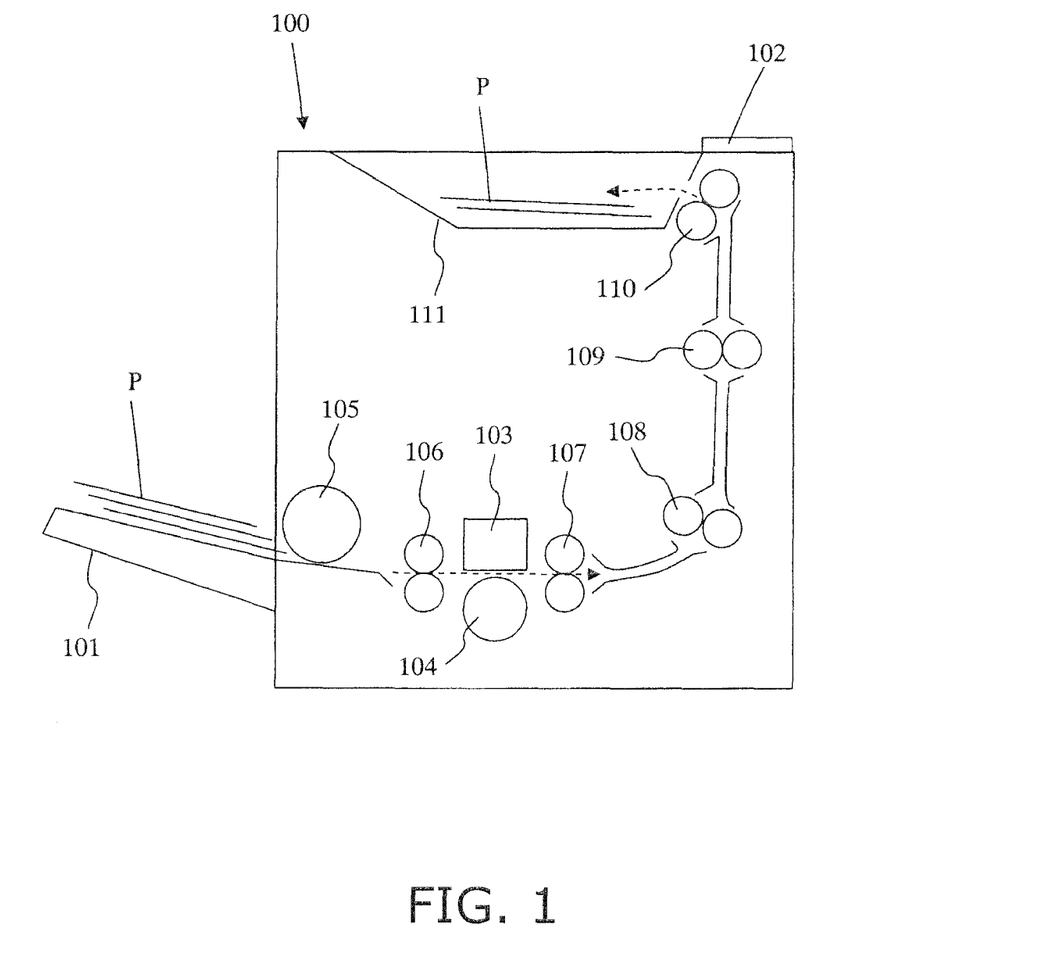
FIG. 1 is a view of a schematic diagram illustrating the entire configuration of the interior of an image scanning device in accordance with a first preferred embodiment of the present invention.

FIG. 1 is view of a schematic diagram illustrating the entire configuration of the interior of an image scanning device 100. The image scanning device 100 is configured to transport a manuscript and to scan an image on the manuscript. Specifically, the image scanning device corresponds to an image scanning section provided in a digital copier, a printer, a multifunction peripheral (MFP), and the like.

Operation of Image Scanning Device

An operation of the image scanning device will be hereinafter briefly explained.

When a user uses the image scanning device 100, the user puts a manuscript P on a manuscript tray 101 and inputs an image scanning setting through an operation unit 102. Here, the manuscript tray 101 is attached to the lateral side of the image scanning device 100. Then, when the user presses a start key provided on the operation unit 102, the image scanning device 100 receives an image scanning instruction and accordingly starts image scanning processing.

When the image scanning device 100 starts the image scanning processing, a light source (not illustrated in the figure) is turned on and accordingly irradiates a roller-shaped white reference board 104 with a light. Here, the light source is disposed in the interior of an image scanning section 103. The irradiated light is reflected by the white reference board 104, passes through a lens in the interior of the image scanning section 103, and is then guided to an image sensor (not illustrated in the figure). Here, the image sensor is mainly made up of a photodiode. The Image sensor performs photoelectric conversion with respect to the guided light. As a result, the image sensor generates the white reference data. Here, the white reference data are temporarily stored as a reference of white color.

Next, the manuscript P put on the manuscript tray 101 is transported to the image scanning section 103 by way of a paper feeding roller 105. When a plurality of manuscripts P is put on the manuscript tray 101, the manuscripts P are transported to the image scanning section 103 one by one. The manuscript P is fed between the image scanning section 103 and the white reference board 104 while its transport speed is regulated by transporting rollers 106. The transporting rollers 106 are disposed between the paper feeding roller 105 and the image scanning section 103. When the manuscript P is positioned between the image scanning section 103 and the white reference board 104, the light source in the interior of the image scanning section 103 is turned on. Then, the light is reflected by the image on the manuscript P and is detected by the image sensor. The light detected by the image sensor is converted into image data of the manuscript P. Thus, scanning of the image on the manuscript P is completed.

After the scanning of the image on the manuscript P, the scanned manuscript P is guided to a paper discharge tray 111 by a plurality of transporting rollers 108, 109, and 110 while its transport speed is regulated by transporting rollers 107. As illustrated in FIG. 1, the transporting rollers 107 are disposed behind the image scanning section 103 in the transporting direction of the manuscript P. Also, the transporting rollers 108, 109, and 110 are disposed behind the transporting roller 107 in the transporting direction of the manuscript P. Also, the discharge tray 111 is disposed on the upper part of the image scanning device 100.

The paper discharge tray 111 is configured to stack and to accommodate a plurality of the manuscripts P.

In the above-mentioned processing, the image scanning device 100 obtains the white reference data and the image data of the manuscript P. Then, the shading correction is performed with respect to the image data of the manuscript P while the white reference data are used as a reference for white color. Thus, a user is provided with the corrected image data of the manuscript P.

Note that a series of processing for obtaining the image data of the manuscript P after the white reference data are obtained is referred to as "manuscript scanning processing." Also, a device for performing the manuscript scanning processing is referred to as a "manuscript scanning device," This will be explained in the following paragraphs.

Configuration of Control System Hardware

Figure 2:
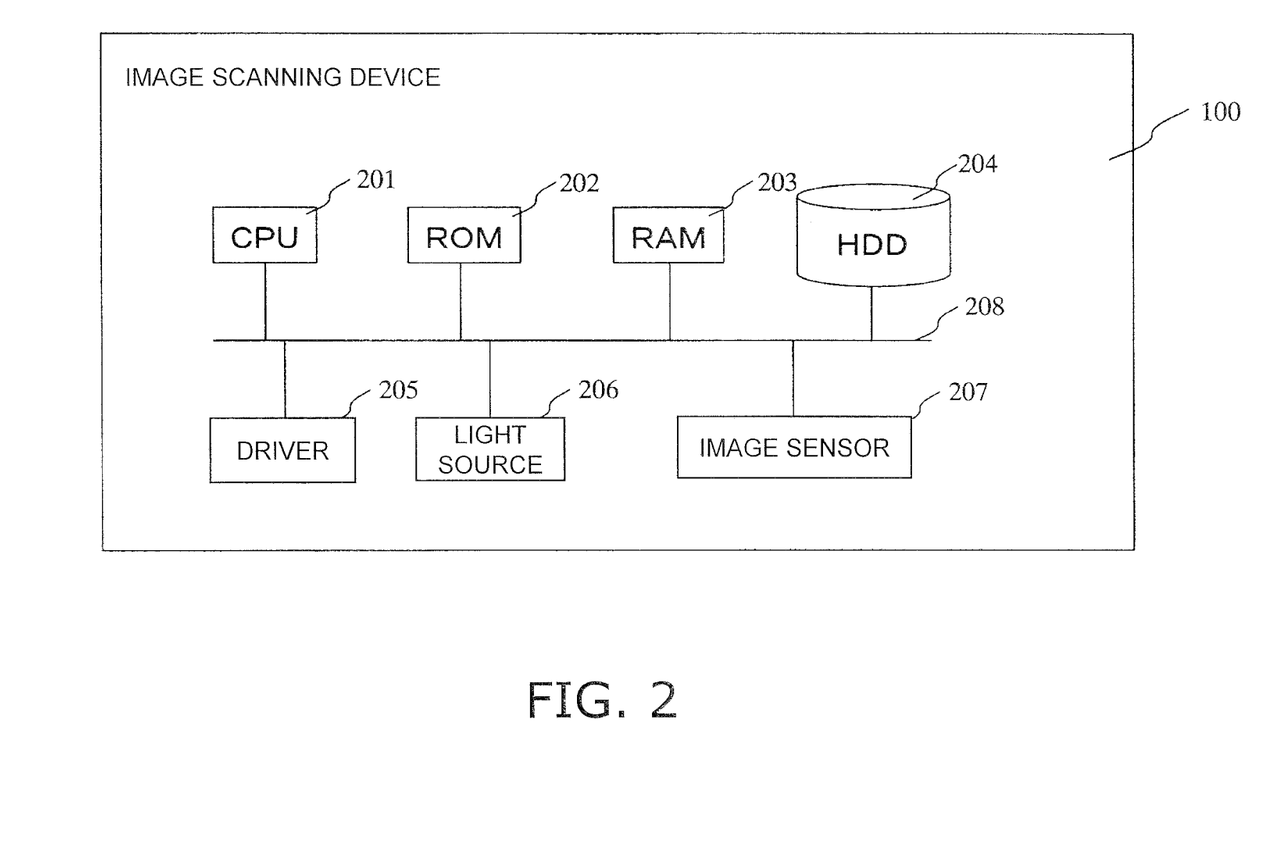
FIG. 2 is a view of a diagram illustrating a configuration of control system hardware of the image scanning device of the first preferred embodiment.

Next, a configuration of control system hardware of the image scanning device 100 will be hereinafter explained. FIG. 2 is a view of a schematic configuration diagram of control system hardware of the image scanning device 100. Here, a detailed illustration of elements not directly related to the present invention will be omitted.

The control circuit of the image scanning device 100 includes a central processing unit (CPU) 201, a read-only memory (ROM) 202, a random access memory (RAM) 203, a hard disk drive (HDD) 204, a driver 205 corresponding to driving sections, a light source unit 206, and an image sensor 207. These elements are connected through an internal bus 208. For example, the CPU 201 is configured to execute a program stored in the ROM 202, the HDD 204, and the like while using the RAM 203 as a work area. Based on the executed result, the CPU 201 is configured to send/receive data and instructions to/from the driver 205, the light source unit 206, and the image sensor 207. Thus, the CPU 201 is configured to control an operation of the driving elements illustrated in FIG. 1. Also, after-mentioned devices (see FIG. 6) excluding the driving elements are configured to be realized when the CPU 201 executes the program. The ROM 202 and the HDD 204 is configured to store a program and data for realizing after-mentioned devices.

Detail of Image Scanning Section

Figure 3A:
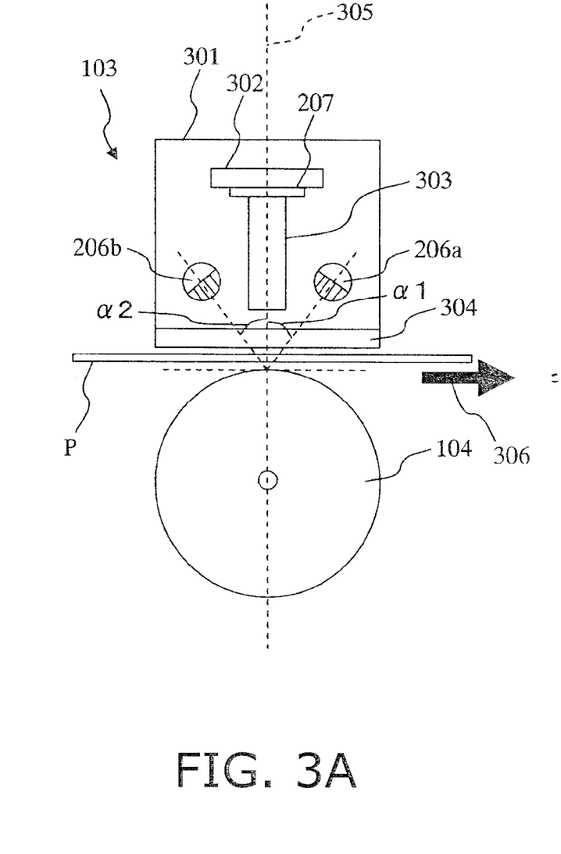
FIG. 3A is a side view illustrating an image scanning section and its peripheral members of the image scanning device of the first preferred embodiment.
Figure 3B:
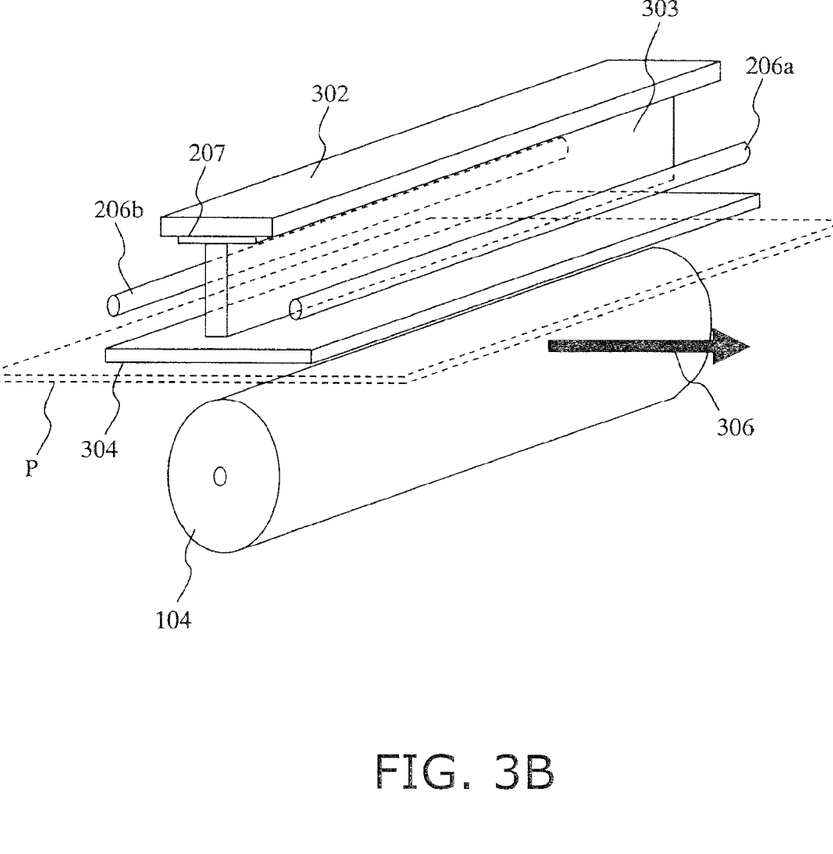
FIG. 3B is a perspective view illustrating the image scanning section and its peripheral members.

Next, the image scanning section 103 will be hereinafter explained in detail,

FIG. 3A is a side view of the image scanning section 103 including a frame 301 and its peripheral members. FIG. 3B is a perspective view of the image scanning section 103.

As illustrated in FIG. 3A, the image scanning section 103 includes the image sensor 207 and a lens 303, and a contact glass 304. When the image scanning section 103 is laterally seen, the image sensor 207, the lens 303, and the contact glass 304 are sequentially disposed from the top to the bottom in this order. The image sensor 207 is classified as a contact image sensor (CIS), and is disposed on a substrate 302. The lens 303 is configured to focus light on an adjacent position to the detection side of the image sensor 207, and the focused light will be guided to the detection side of the image sensor 207. The contact glass 304 is configured to prevent the manuscript from entering an opposed position to the lens 303.

The roll shaped white reference board 104 is disposed below the contact glass 304. Also, a gap is produced between the contact glass 304 and the white reference board 104. A sheet of manuscript is allowed to be transported through the gap. In other words, the gap approximately corresponds to the thickness of a sheet of manuscript.

When the image scanning section 103 is laterally seen, centers of the substrate 302, the image sensor 207, the lens 303, the contact glass 304, and the white reference board 104 respectively corresponds to a light axis 305 of the lens 303. With the arrangement, the detection side of the image sensor 207 is opposed to the white reference board 104 disposed below the image sensor 207. Thus, the image sensor 207 is configured to detect the reflected light from the white reference board 104.

Furthermore, two light sources 206a and 206b are disposed in the interior of the image scanning section 103. Laterally seen, the light sources 206a and 206b are symmetrically disposed through the light axis 305 of the lens 303 as the symmetric axis. In other words, the reflection side of the white reference board 104 is interposed between the light sources 206a and 206b. Also, the light sources 206a and 206b are configured to irradiate the same amount of light. When the light sources 206a and 206b irradiate light, the light is irradiated to the manuscript P transported below the light sources 206a and 206b through the contact glass 304 or to the white reference board 104 disposed below the light sources 206a and 206b.

Also, the light source 206a is disposed in the downstream of a manuscript transporting direction 306 relative to the light axis 305. The light source 206a is positioned for setting an incident angle α1 to a predetermined angle (60 degrees in FIG. 3A). Here, the angle α1 is formed by a direction of the light axis 305 of the lens 303 (i.e., a direction perpendicular to the reflection side of the white reference board 104) and an incident direction of light from the light source 206a. On the other hand, the light source 206b is disposed upstream of the manuscript transporting direction 306 relative to the light axis 305. The light source 206b is positioned for setting an incident angle α2 to a predetermined angle (60 degrees in FIG. 3A). Here, the angle α2 is formed by the direction of the light axis 305 of the lens 303 and an incident direction of light from the light source 206b. Furthermore, as illustrated in FIG. 3B, the substrate 302, the image sensor 207, the lens 303, the contact glass 304, the white reference board 104, the light sources 206a and 206b (i.e., light source unit) respectively have width greater than that of the manuscript P to be transported. Also, these elements are arranged in parallel to each other. More specifically, their axes in the width direction are arranged in parallel to each other.

When the light sources 206a and 206b simultaneously irradiate the white reference board 104, uniform light of a balanced amount are irradiated to the white reference board 104 from both directions. More specifically, when the white reference board 104 is irradiated, the amount of incident light on the upstream and downstream sides in the manuscript transporting direction 306 is the same. Furthermore, the amount of incident light on each side is the same in the width direction. Also, when the incident light is reflected, the amount of the reflected light will be balanced. With the above-mentioned configuration, a manuscript is normally scanned or the white reference data are obtained.

Detailed Explanation of Detection of Attached Substance

Next, detection of an attached substance by the image scanning section 103 will be hereinafter explained in detail.

Figure 4A:
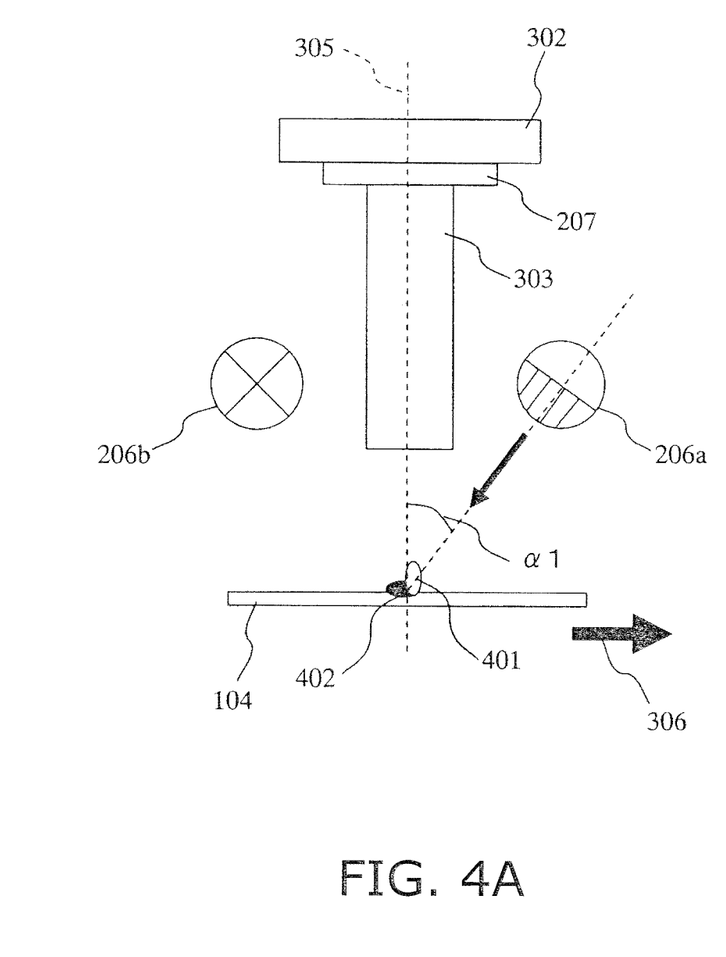
FIG. 4A is a side view of the image scanning section with an attached substance.

In an example of FIG. 4A, an attached substance 401 is attached to the reflection side of the white reference board 104. Also, the reflection side of the white reference board 104 is irradiated from only one of two oblique directions. In an example of FIG. 4B, the reflection side of the white reference board 104 is irradiated from both oblique directions.

As illustrated in FIG. 4A, when the attached substance 401 is detected by the image scanning section 103, the light source 206a is turned on while the light source 206b is turned off. Here, the light source 206a is disposed downstream in the manuscript transporting direction 306 while the light source 206b is disposed on the upstream in the manuscript transporting direction 306 relative to the light axis 305. Note that the light source 206a and the light source 206b are hereinafter referred to as "downstream light source 206a" and "upstream light source 206b," respectively. Then, the light irradiated from the turned-on light source 206a moves to the reflection side of the white reference board 104 at a predetermined incident angle α1, and hits the attached substance 401 attached to the reflection side of the white reference board 104. Thus, the attached substance 401 receives the light with the incident angle α1 from only one direction. Accordingly, a shadow 402 is cast from the attached substance 401 in an opposite direction from the incident direction. Here, the shadow 402 is easily cast from the attached substance 401 because the upstream light source 206b is turned off.

Figure 4B:
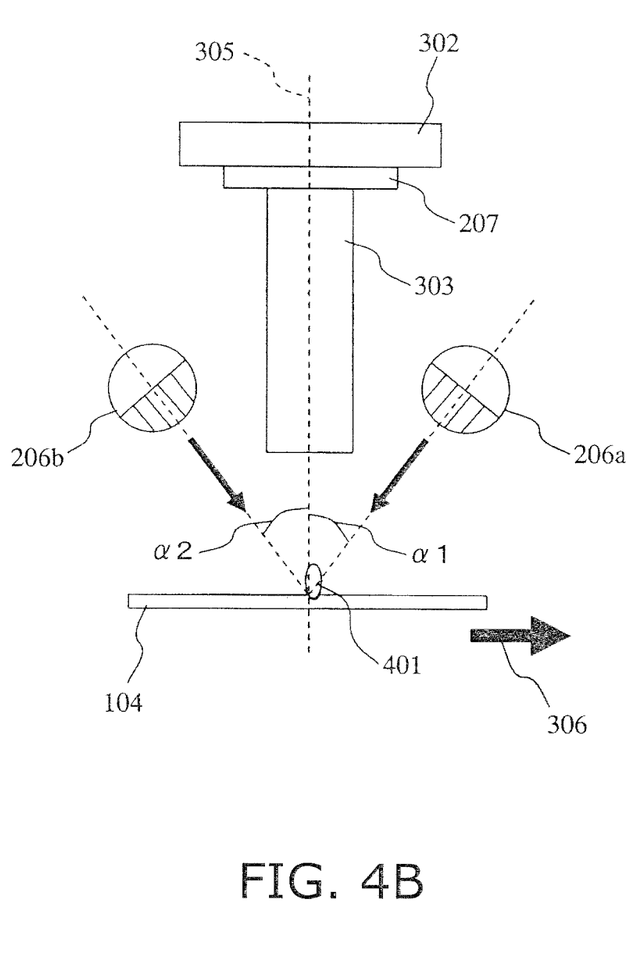
FIG. 4B is side view of the image scanning section with the attached substance.

As illustrated in FIG. 4B, when the light sources 206a and 206b simultaneously irradiate the white reference board 104 from both oblique directions, the lights uniformly irradiate the surroundings of the attached substance 401. Accordingly, shadow is hardly cast from the attached substance 401.

The following is a detailed explanation of the white reference board 104 data detected by the image sensor 207 when a shadow is cast from the attached substance 401.

Figure 5A:
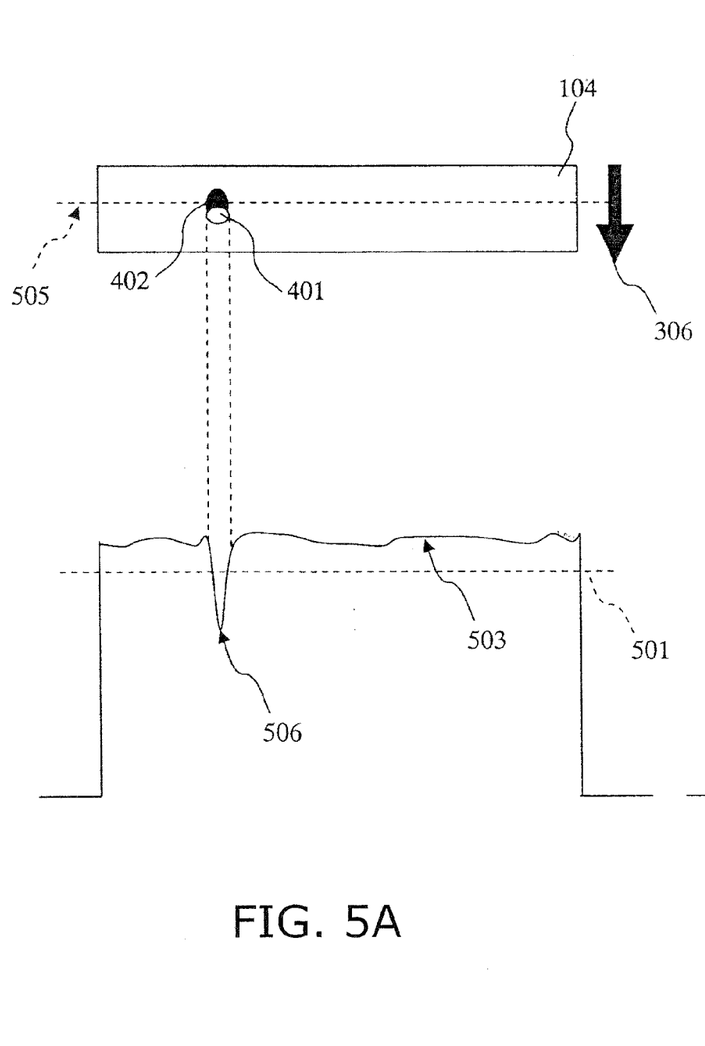
FIG. 5A shows a curve and an attached substance threshold value of white reference board data to be obtained in detecting the attached substance.
Figure 5B:
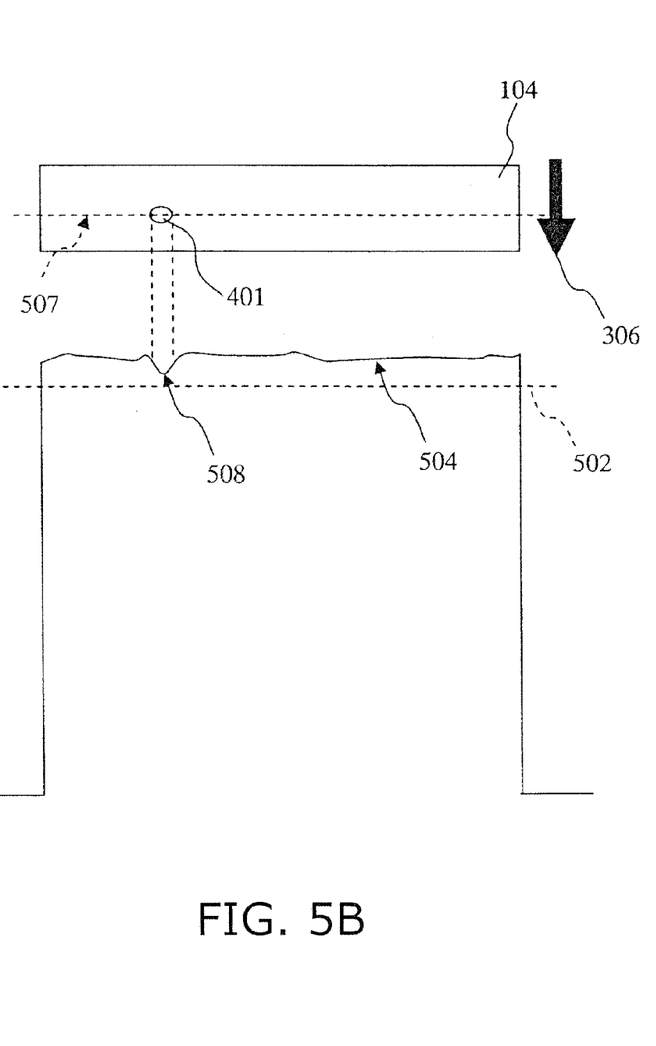
FIG. 5B shows a curve and an attached substance threshold value of the white reference board data to be obtained in detecting the attached substance.

FIG. 5A is a view of a diagram showing a curve of the white reference board 104 data to be obtained when the reflection side of the white reference board 104 is irradiated from only one oblique direction and a threshold value for detecting the attached substance. FIG. 5B is a view of a diagram showing a curve of the white reference board 104 data to be obtained when the white reference board 104 is irradiated from both oblique directions and a threshold value for detecting the attached substance.

Here, the threshold value for detecting the attached substance in FIG. 5A (or 5B) is obtained as follows. First, the reflection side of the white reference board 104 is irradiated from only one oblique direction (or both oblique directions) while the substance (e.g., a piece of paper and dirt) generated in the interior of the image scanning device 103 is attached to the reflection side of the white reference board 104. Then, the amount of reflected light is averaged. In other words, the threshold value is a predicted value of the amount of reflected light from the attached substance 401. Specifically, a threshold value 501 for detecting the attached substance (see FIG. 5) is obtained when the attached substance on the reflection side of the white reference board 104 is irradiated from only one oblique direction. Also, a threshold 502 for detecting the attached substance (see FIG. 5B) is obtained when the attached substance on the reflection side of the white reference board 104 is irradiated from both oblique directions. As illustrated in FIGS. 5A and 5B, absolute value of a curve 503 in FIG. 5A is approximately half of absolute value of a curve 504 in FIG. 5B. This is because the curve 503 in FIG. 5A is the amount of reflected light in one-directional irradiation.

Referring to FIG. 4 again, when only the downstream light source 206a is turned on, the shadow 402 is cast from the attached substance 401 on the white reference board 104. FIG. 5A illustrates the detected result of the amount of reflected light from the white reference board 104 when the shadow 402 is cast on a predetermined portion 505 in a sub-manuscript transporting direction. Here, the sub-manuscript transporting direction is on a plane including the manuscript transporting direction 306, but is perpendicular to the manuscript transporting direction 306. Here, the amount of reflected light 506 from the shadow 402 is extremely small. It is easy to understand that the amount of reflected light 506 is equal to or less then the threshold value 501 (See FIG. 5A).

Therefore, it is possible to determine promptly that the attached substance 401 exists on the white reference board 104.

On the other hand, FIG. 5B illustrates the amount of reflected light from the white reference board 104 detected by the image sensor 207 when the light sources 206a and 206b irradiate the white reference board 104 from both oblique directions. As similarly illustrated in FIG. 5A, FIG. 5B illustrates the amount of reflected light from the white reference board 104 in the sub-manuscript transporting direction. Here, the attached substance 401 is attached on a predetermined portion 507 of the white reference board 104 in the sub-manuscript transporting direction. Also, the amount of reflected light 508 from the attached substance 401 is slightly smaller than the amount of the reflected light from the white reference board 104. However, the amount of reflected light 508 from the attached substance 401 is more than the threshold value 502. In this case, it is determined that no attached substance 401 exists. It should be apparent from this disclosure that it is possible to detect the attached substance 401 by appropriately setting the threshold value 502 based on the result of FIG. 5B. However, it should be understood from this disclosure that it is easier to detect the attached substance 401 based on the result of FIG. 5A that the shadow 402 is cast from the attached substance 401, compared to detection of the attached substance 401 based on the result of FIG. 5B.

Here, the amount of reflected light depends on the properties of the attached substance (e.g., size, color, and shape). However, if the attached substance has a white color (e.g., a piece of paper), it is much more difficult to determine the existence of the attached substance when the light sources 206a and 206b simultaneously irradiate the white reference board 104 from both oblique directions.

Control Processing

Next, processing by the image scanning device 100 will be hereinafter explained in detail.

Figure 6:
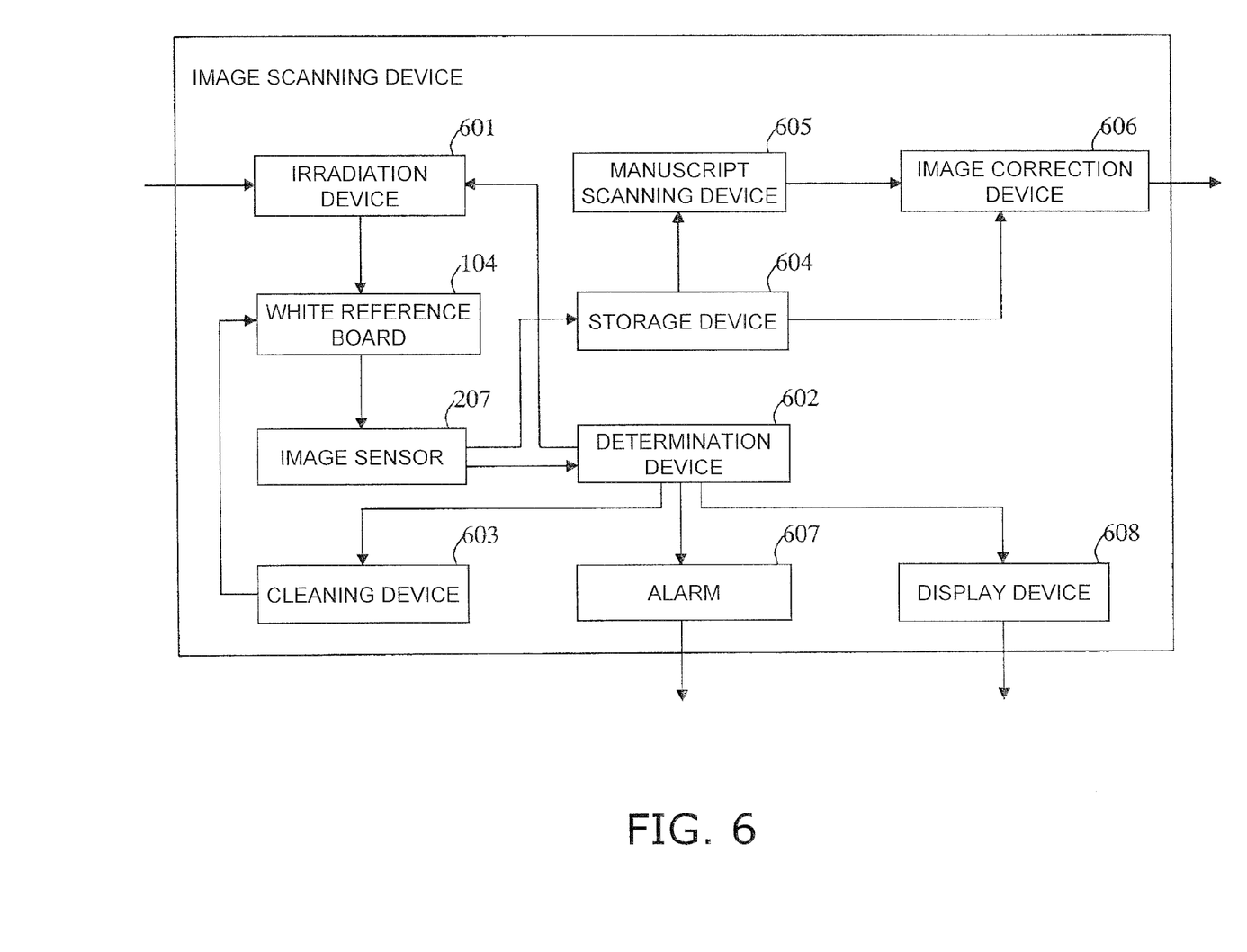
FIG. 6 is a view of a functional block diagram of the image scanning device of the first preferred embodiment.
Figure 7:
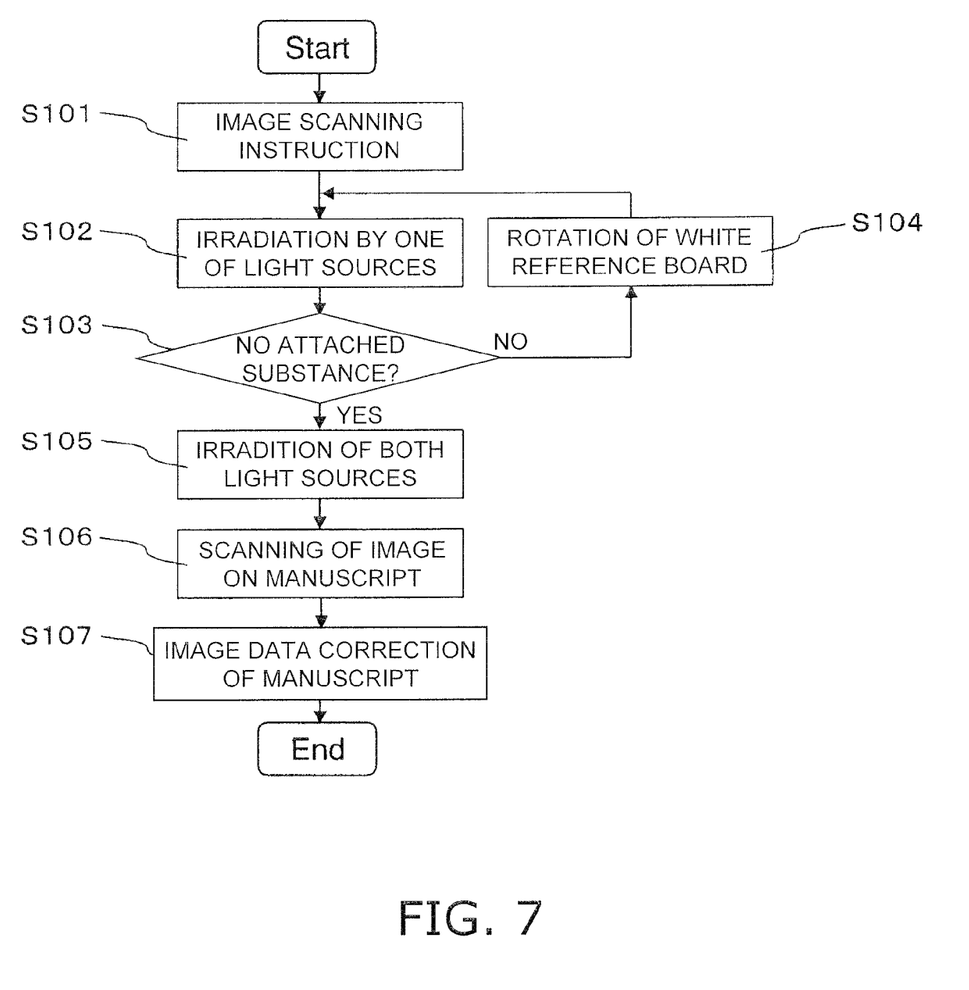
FIG. 7 is a view of a flowchart illustrating a series of procedures to detect the attached substance.

FIG. 6 is a view of a functional block diagram of the image scanning device 100 of the present embodiment. FIG. 7 is a view of a flowchart illustrating a series of procedures by which the image scanning device 100 detects the attached substance.

Referring to FIGS. 1, 6, and 7, when a user puts the manuscript P on the manuscript tray 101 and inputs an image scanning instruction through the operation unit 102, an irradiation device 601 irradiates the white reference board 104 in response to a signal from the operation unit 102. Here, the irradiation device 601 includes the light source unit and the like. Specifically, only the downstream light source 206a is turned on while the upstream light source 206b is turned off (Step S101 and then Step S102 in FIG. 7).

Thus, the white reference board 104 is irradiated, and the reflected light from the white reference board 104 is detected by the detection side of the image sensor 207. The detected data of the reflected light are transmitted to a determination device 602. The determination device 602 determines if the attached substance 401 exists on the reflection side of the white reference board 104 based on the detected data and the preliminarily stored threshold value 501 for detecting the attached substance (Step S103 in FIG. 7).

When it is determined that the attached substance 401 exists on the reflection side of the white reference board 104, the determination device 602 transmits the information to a cleaning device 603 (No in Step S103 and then Step S104 in FIG. 7). The cleaning device 603 rotates the roll shaped white reference board 104 at a predetermined angle. In other words, it is possible to move a portion of the white reference board 104 when the attached substance 401 has been determined to exist. Thus, the cleaning device 603 changes the reflection side of the white reference board 104.

When rotation of the white reference board 104 is completed, the irradiation device 601 irradiates the white reference board 104 from only one oblique direction again. Then, the determination device 602 determines if the attached substance exists (Steps S104, S102, and S103 sequentially in this order in FIG. 7).

When it is determined that no attached substance 401 exists on the reflection side of the white reference board 104, the light sources 206a and 206b of the irradiation device 601 are turned on. Thus, the image sensor 207 detects the reflected light from the white reference board 104 (Yes in Step S103 and then Step S105 in FIG. 7). Here, the detected data of the white reference board 104 are temporarily stored in storage device 604 as the white reference data (i.e., a reference of white color).

When the white reference data are stored, a manuscript scanning device 605 scans an image on the manuscript P put on the manuscript tray 101 (Step S106 in FIG. 7). The image data of the scanned manuscript are transmitted to an image correction device 606. The image correction device 606 corrects the image data based on the image data of the manuscript P and the white reference data stored in the above-mentioned Step (Step S107 in FIG. 7). The series of processing is referred to as "shading correction." After the shading correction is completed, the image data of the manuscript P include a sharp image.

Thus, according to the present image scanning device, the irradiation device 601 irradiates the reflection side of the white reference board 104 from only one oblique direction, and the determination device 602 determines if the attached substance 401 exists on the reflection side of the white reference board 104 based on the reflected light.

In other words, as seen in FIGS. 4A and 4B, when the attached substance 401 exists on the reflection side of the white reference board 104, the shadow 402 is cast from the attached substance 401 and existence of the attached substance 401 is determined by detecting the amount of reflected light from the shadow 402. There is a big difference between the amount of reflected light from the shadow 402 cast from the attached substance 401 and the amount of reflected light from the white reference board 104. In addition, the amount of the reflected light from the shadow 402 is quite small. Therefore, it is possible to detect accurately the existence of the shadow 402, that is, the existence of the attached substance 401. As a result, it is possible to detect reliably the attached substance 401 before performing the shading correction. Also, it is possible to prevent deterioration of image quality caused by the attached substance 401.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Example A

The irradiation device 601 of the present embodiment is configured to irradiate the white reference board 104 from one oblique direction (i.e., at a predetermined incident angle $\alpha 1$). However, the angle $\alpha 1$ may be one of various suitable angles as long as the shadow 402 is cast from the attached substance 401. Here, it is preferable to set the angle $\alpha 1$ to fall in the range of 30 to 60 degrees. With the setting of the angle $\alpha 1$, the shadow is easily cast from the attached substance 401 and the absolute value of the amount of the reflected light will be large. Accordingly, it is possible to determine accurately if the attached substance 401 exists.

Example B

Laterally seen, the light sources 206a and 206b of the present embodiment are symmetrically arranged through the light axis 305 of the lens 303. In other words, the reflection side of the white reference board 104 is interposed between the light sources 206a and 206b. However, arrangement of the light sources 206a and 206b may not be limited to this as long as the white reference board 104 or the manuscript P is uniformly irradiated from both oblique directions. For example, the following two light sources may be prepared. One may be configured to irradiate a large amount of light while the other may be configured to irradiate a small amount of light. The light sources may be non-symmetrically arranged with respect to the reflection side of the white reference board 104. Also, the light sources may be configured to irradiate uniformly the reflection side of the white reference board 104 from both sides. With the configuration, it is possible to change the arrangement of the light sources. Accordingly, the entire shape of the image scanning device 100 may be changed.

Example C

Laterally seen, the light sources 206a and 206b of the present embodiment are symmetrically disposed. In other words, the light sources 206a and 206b are respectively arranged upstream and downstream in the manuscript transporting direction 306 relative to the light axis 305. However, the arrangement of the light sources 206a and 206b may not be limited to this as long as the white reference board 104 or the manuscript P is irradiated with a sufficient amount of light. For example, the light sources 206a and 206b may be arranged upstream and downstream in a direction perpendicular to the manuscript transporting direction 306.

Example D

Laterally seen, the image sensor 207 is arranged on the upper part of the image scanning section 100 of the present invention. Thus, the image scanning section 100 is configured to detect the reflected light from the white reference board 104 or the manuscript P from above the white reference board 104 or the manuscript P. However, the image scanning section 100 may be configured to detect the reflected light from any of the bottom, right, and left directions.

Example E

Figure 8A:
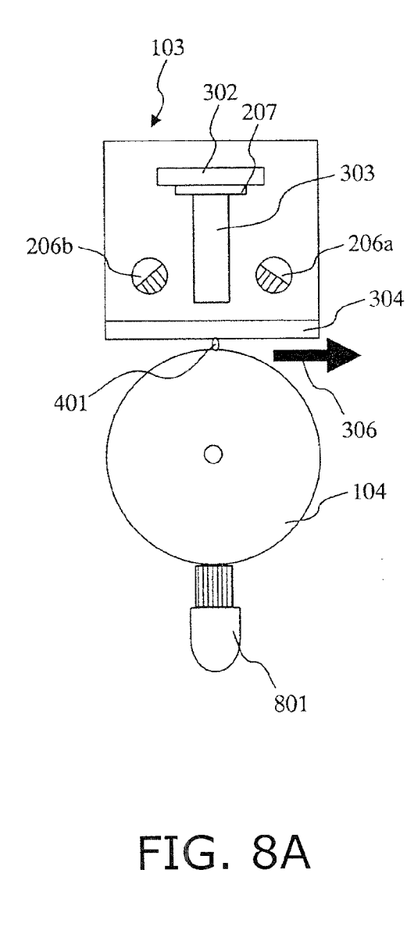
FIG. 8A is a side view of an image scanning device according to a second preferred embodiment of the present invention including a cleaning device.

The cleaning device 603 of the present embodiment is only configured to rotate the white reference board 104 at a predetermined angle. However, the cleaning device 603 may be further provided with a member for removing the attached substance (e.g., a brush). In this case, the cleaning device 603 may be configured to remove the attached substance 401 on the reflection side of the white reference board 104 with the member. In an example of FIG. 8A, an attached-substance absorption brush 801 is disposed below the white reference board 104 when laterally seen. Fibers of the brush 801 make contact with the white reference board 401. In this case, when the white reference board 104 is rotated by the cleaning device 603, the attached substance 401 is absorbed and removed by the fibers of the brush 801. Arrangement of the brush 801 may not be limited to this as long as it does not block scanning of the image scanning section 100. The member for removing the attached substance may be a small attached-substance vacuum cleaner for inhaling the attached substance 401.

Example F

Instead of or along with the cleaning device 603 of the present embodiment, an alarm 607 or display device 608 may be provided. Here, the alarm 607 is configured to give warning. The display device 608 is configured to display the information that the attached substance 401 is attached on the white reference board 104.

Example G

Figures 8B, 8C:
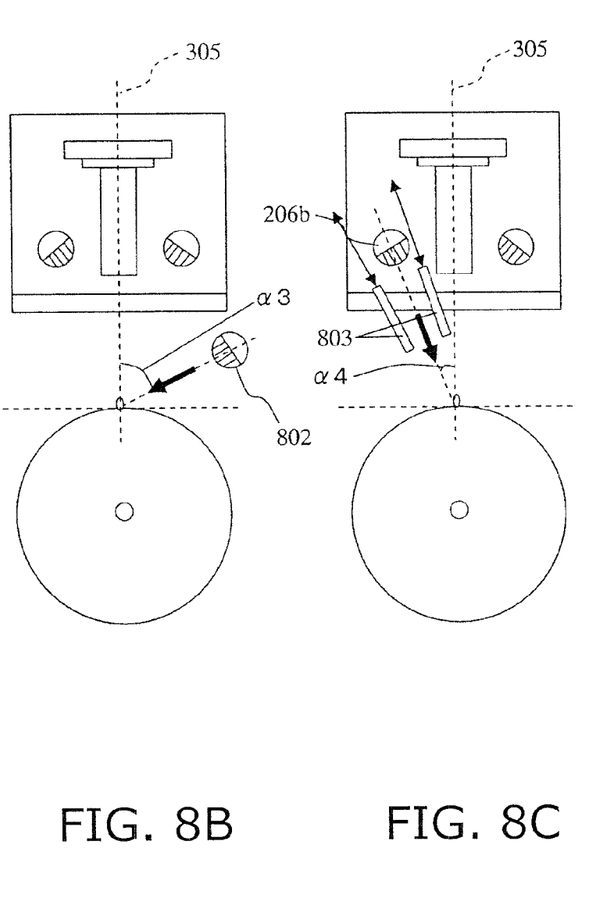
FIG. 8B is a side view of an image scanning device according to a third preferred embodiment of the present invention including an additional lightsource.
FIG. 8C is a side view of an image scanning device according to a fourth preferred embodiment of the present invention including reflection boards.

The light sources 206a and 206b of the present embodiment are configured to irradiate with a light source to be used in scanning of an image on the manuscript P. However, in addition to the light source for scanning, a light source for detecting the attached substance 401 may be further provided. In an example of FIG. 8B, a light source 802 is provided to detect the attached substance. Here, the light source 802 is required to irradiate the reflection side of the white reference board 104 from only one oblique direction. Also, the oblique direction and the light axis 305 form a predetermined incident angle $\alpha 3$. Furthermore, a plurality of light sources may be provided to detect the attached substance. Specifically, the plurality of light sources is configured to irradiate in the same direction to regulate the amount of light.

Example H

The image scanning device 100 of the present embodiment may be further provided with a reflection board for focusing the light from the light source. In an example of FIG. 8C, reflection boards 803 are disposed in the vicinity of the light source 206b. Here, only when the attached substance is detected, the light source 206b is configured to be turned on. The reflection boards 803 are configured to move. The reflection boards 803 are configured to move to the surroundings of the turned-on light source 206b only when the attached substance is detected. Also, only the light source 206b is configured to irradiate from only one oblique direction. Here, the one oblique direction and the light axis 305 form a predetermined incident angle $\alpha 4$. With the configuration, the shadow 402 is clearly cast from the attached substance 401. Accordingly, it is possible to enhance accuracy of the detection of the attached substance 401.

Example I

Figure 8D:
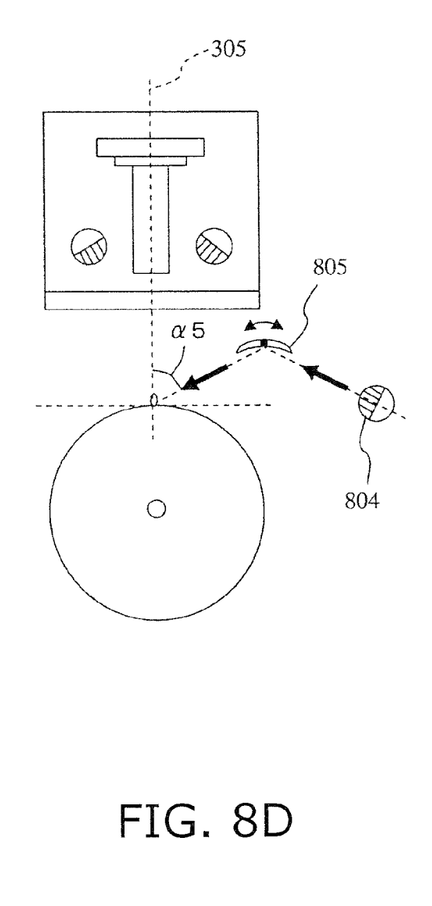
FIG. 8D is a side view of an image scanning device according to a fifth preferred embodiment of the present invention including an additional lightsource and a reflecting board.

In an example of FIG. 8D, a light source 804 is separately from the image scanning device 100. Specifically, the light source 804 is arranged away from the image scanning device 100. The light source 804 is configured to detect the attached substance. Furthermore, a reflection board 805 is provided to reflect the light from the light source 804 onto the reflection side of the white reference board 104 from only one oblique direction. Here, the one oblique direction and the light axis 305 form a predetermined incident angle $\alpha 5$. With the configuration, the reflection board 805 is configured to focus light from the light source 804 and to irradiate the white reference board 104 even when the light source 804 is not arranged in a predetermined position. Also, arrangement of elements (e.g., the white reference board 104) is easily changed depending on arrangement of the reflection board 805. Reduction of a space for elements may be realized depending on the arrangement.

Also, when the reflection board 805 is rotatably disposed and its angle is regulated, it is possible to regulate easily density of the shadow 402 cast from the attached substance 401. Accordingly, it is possible to change easily the accuracy of detecting the attached substance 401 in accordance with the density of the shadow 402.

Example J

In the example embodiment J, the following light source and reflection board are provided. The light source is disposed in only one oblique direction from the reflection side of the white reference board 104. The reflection board is configured to rotate. The reflection board is configured to focus light from the light source by its rotation. The reflection board is also configured to irradiate the reflected light onto the image sensor 207. In this case, when the image data of the manuscript P is scanned by the light source and the reflection board, the manuscript is uniformly irradiated. Also, before the white reference data is formed, the reflection side of the white reference board 104 is irradiated from only one oblique direction.

Example K

Figure 8E:
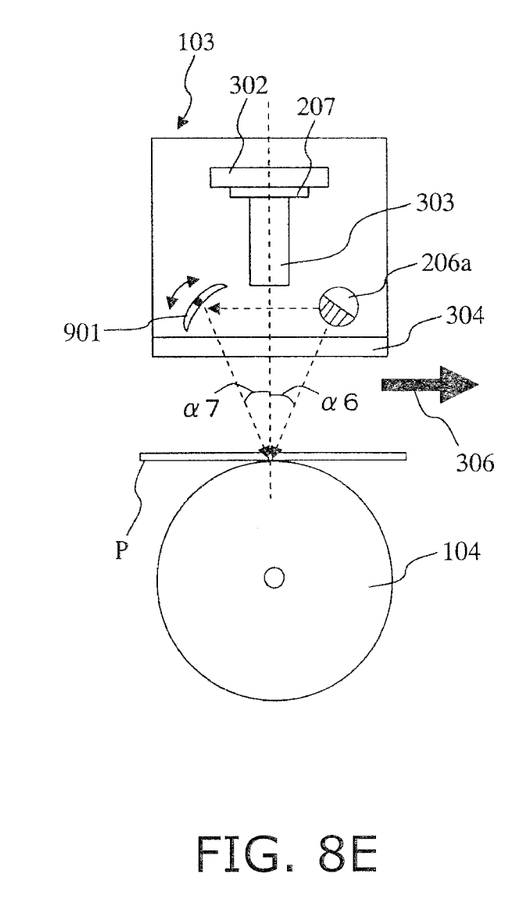
FIG. 8E is a side view of the image scanning section and its peripheral members according to a sixth preferred embodiment of the present invention.
Figure 8F:
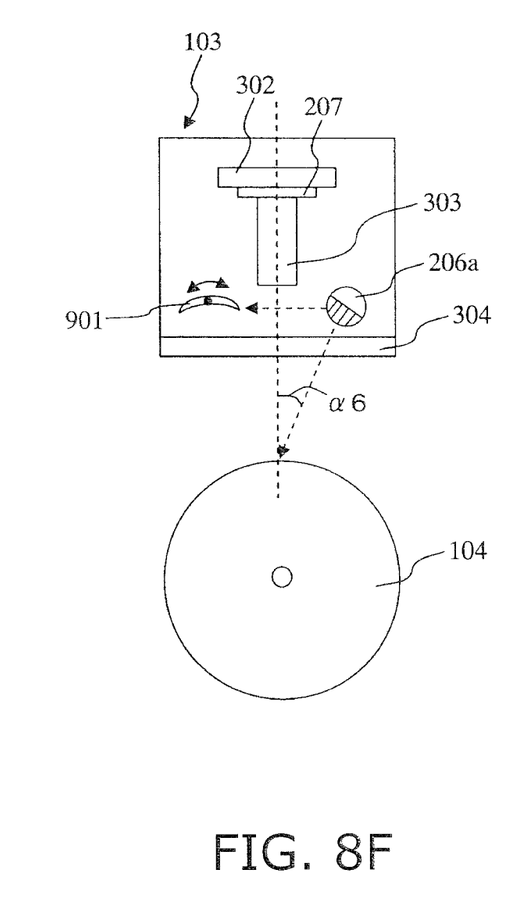
FIG. 8F is a side view of the image scanning section and its peripheral members of the sixth alternate embodiment.

FIGS. 8E and 8F illustrate an example embodiment K. In this case, a light source 206a is disposed downstream in the manuscript transporting direction 306 relative to the lens 303. Also, the light source 206a is arranged to irradiate the reflection side of the white reference board 104 from one oblique direction. Here, the oblique direction and the light axis of the lens 303 form a predetermined incident angle $\alpha 6$. In the example of FIG. 8E, the incident angle $\alpha 6$ is preferably set to 30 degrees. Furthermore, a reflection board 901 is provided. The reflection board 901 is configured to rotate. The reflection board 901 is configured to focus the light from the light source 206a onto the upstream side in the manuscript transporting direction 306. Here, the direction of the reflected light and the light axis of the lens 303 form a predetermined incident angle $\alpha 7$. In the example of FIG. 8E, the incident angle $\alpha 7$ is set to 30 degrees.

Rotation of the reflection board 901 makes it possible to irradiate uniformly the manuscript from both directions. Also, rotation of the reflection board 901 makes it possible to irradiate the reflection side of the white reference board from only one oblique direction. In this case, when the image data of the manuscript P are scanned, the incident angles $\alpha 6$ and $\alpha 7$ are matched by rotating the reflection board 901 and thus the manuscript is uniformly irradiated (see FIG. 8E). Then, before forming the white reference data, the reflection board 901 is rotated at a predetermined angle to prevent uniformly irradiating the white reference board, and the reflection side of the white reference board 104 is irradiated from only one oblique direction (see FIG. 8F). Here, the predetermined angle is set to prevent focus of the light from the light source 206a. For example, the predetermined angle corresponds to the rotational angle of the reflection board 104 rotated to prevent the reflection board 104 from focusing the light from light source 206a. With the configuration, it is possible to reduce the number of components (e.g., a light source). Also, it is possible to obtain appropriately the image data of the manuscript and the white reference data.

Example L

In the above-mentioned embodiment, the attached substance is detected before the scanning of an image of the manuscript. However, the attached substance may be detected at arbitral timing. For example, the attached substance may be detected in a standby condition of the image scanning device. Also, the attached substance may be detected after the image scanning device is switched from a power-saving mode to a normal mode. Here, the power-saving mode is configured to inhibit power consumption of the image scanning device in a standby condition. Also, the image scanning device is configured to perform readily image scaming processing on the normal mode. Also, the attached substance may be detected after predetermined sheets of paper are scanned or after a predetermined period of time is elapsed.

Example M

In the above-mentioned embodiment, the image scanning device is configured to scan only an image on one side of the manuscript. However, the image scanning device may be provided with another image scanning section. Accordingly, the image scanning device may be configured to scan images on both sides of the manuscript.

Example N

In the above-mentioned embodiment, the image scanning device is configured to detect the attached substance 401 on the reflection side of the white reference board 104. However, the image scanning device may be configured to detect the attached substance 401 on the contact glass 304. For example, the amount of reflected light from the white reference board 104 without any attached substance and the amount of reflected light from the contact glass 304 without any attached substance are preliminarily stored in a suitable storage device. Then, when the attached substance is detected, the amount of reflected light from the white reference board 104 and the amount of reflected light from the contact glass 304 are separately analyzed. Accordingly, it is possible to detect the attached substance on the contact glass 304. When the attached substance is detected on the surface of the contact glass 304, the above-mentioned cleaning device 603, the alarm 607, and the display device 608 are configured to cope with this.

Example O

In the above-mentioned embodiment, the attached substance 401 on the reflection side of the white reference board 104 is detected. However, it is also possible to detect a scratch on the reflection side of the white reference board 104, a scratch on the surface of the contact glass 304, and the like depending on a preliminarily stored threshold value to detect the attached substance. In this case, it should be understood that the threshold value is uniquely set for the above-mentioned scratches.

As described above, the image scanning device of the present invention is useful for a copier, a printer, and a MFP. Also, the image scanning device of the present invention is workable as an image scanning device for enhancing accuracy of detecting the attached substance on the reflection surface of the white reference board of the image scanning device.

GENERAL INTERPRETATION

A used herein, the following directional terms "forward, rearward, above, downward, vertical, horizontal, below, and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device includes hardware and/or software that is constructed and/or programmed to carry out the desired function.

Terms that are expressed as "means-plus function" in the claims should include any structure that can be utilized to carry out the function of that part of the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "substantially", "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An image scanning device, comprising:
a white reference board having a uniform white color;
an irradiation device having a light source unit, the light source unit being configured to irradiate a reflection side of the white reference board from only one oblique direction;
an image sensor being configured to detect reflected light from the white reference board; and
a determination device being configured to determine if an attached substance exists on the reflection side of the white reference board based on the reflected light detected by the image sensor, wherein
the light source unit has a light source,
the irradiation device includes a reflection board, the reflection board is configured to rotate, the reflection board is configured to focus the light from the light source by its rotation and reflects the focused light onto a manuscript, and
the irradiation device is configured to irradiate uniformly the manuscript with the light source and the reflection board when image data of the manuscript are scanned, and the irradiation device is configured to irradiate the reflection side of the white reference board from only one oblique direction with the light source before white reference data are generated.

2. The image scanning device according to claim 1, further comprising a cleaning device that is configured to clean the white reference board.

\* \* \* \* \*